US005163010A

United States Patent [19]

Klein et al.

[11] Patent Number: 5,163,010

[45] Date of Patent: Nov. 10, 1992

[54] FORMULATING DEVICE FOR COSMETICALLY FUNCTIONAL COSMETIC PRODUCTS

[75] Inventors: Gustave J. Klein, Great Neck, N.Y.; Jose F. Pano, Barcelona, Spain

[73] Assignee: Revlon Consumer Products Corporation, New York, N.Y.

[21] Appl. No.: 483,366

[22] Filed: Feb. 22, 1990

[51] Int. Cl.[5] ............................................ G06F 15/20

[52] U.S. Cl. .................................. 364/479; 222/135; 366/160

[58] Field of Search .................. 364/479; 222/135, 52; 366/160, 161, 162, 152, 132, 18; 177/70

[56] References Cited

U.S. PATENT DOCUMENTS

| | | | |
|---|---|---|---|
| 3,416,517 | 12/1968 | Adams et al. . | |
| 3,527,236 | 9/1970 | Norwell . | |
| 3,596,390 | 11/1968 | Scalice . | |
| 4,158,704 | 6/1979 | Baer et al. . | |
| 4,160,271 | 7/1979 | Grayson et al. . | |
| 4,222,448 | 9/1980 | Sunkle et al. | 177/70 |
| 4,258,731 | 3/1981 | Tsujimoto et al. . | |
| 4,275,822 | 6/1981 | Juffn et al. | 364/479 |
| 4,351,591 | 9/1982 | Stockett . | |
| 4,541,442 | 9/1985 | Hollmann et al. . | |
| 4,653,010 | 3/1987 | Figler et al. . | |
| 4,705,083 | 11/1987 | Rossetti | 364/479 |
| 4,766,913 | 8/1988 | Klien . | |
| 4,830,508 | 5/1989 | Hisuchi et al. | 366/18 |
| 4,871,262 | 10/1989 | Krauss et al. | 222/135 |
| 4,886,367 | 12/1989 | Bragg et al. | 366/132 |
| 4,976,137 | 12/1990 | Decker et al. | 222/52 |

*Primary Examiner*—Jerry Smith
*Assistant Examiner*—Jim Trammel
*Attorney, Agent, or Firm*—Julie Blackburn

[57] ABSTRACT

The present invention is directed to an apparatus for formulating a custom mixed cosmetic product at the point of sale in response to specific input criteria. The apparatus includes a plurality of containers for storing a plurality of cosmetically functional mixtures. The cosmetically functional mixtures are adapted to combine to form a cosmetic product. An input means is provided for entering into a computer the specific input criteria that is representative of a customer's need. The computer outputs a series of instruction sets in response to the specific input criteria to a dispensing means. The dispensing means automatically and sequentially dispenses the plurality of cosmetically functional mixtures into a formulation receptacle in response to the instruction sets. The plurality of cosmetically functional mixtures combine in the receptacle to form a custom mixed formulation of cosmetic product at the point of sale.

5 Claims, 13 Drawing Sheets

FORMULATING DEVICE FOR COSMETICALLY FUNCTIONAL COSMETIC PRODUCTS

BACKGROUND OF THE INVENTION

1. Field of the Invention

This invention is directed to the field of cosmetic products and more particularly, to a device for formulating a cosmetic product and automatically dispensing active chemicals to custom mix the formulation in response to the customer's need at the point of sale.

2. Description of the Prior Art

In the field of cosmetics, it has been the common practice to sell various products in pre-packaged form for off the shelf selection. For example, hair treatment products such as permanent wave solutions, hair-conditioners, shampoos, dyes and other hair-treatment compounds are pre-formulated on the basis of generic categories. The disadvantage inherent in this method of supply is that the preformulated products do not account for the fact that each person's hair requires a compound which accommodates differences in physical properties of the hair, such as its degree of damage due to dyeing or bleaching, etc., its porosity, and its size.

For example, the hair is subjected to all forms of treatments that cause negative effects. Some damage the chemical bonds which hold the hair together. Some change the hydrophobic-hydrophilic balance which affects the porosity. High temperature from heat styling tools also degrade the keratin protein of the hair. Alkaline services create solubility in the hair and increase porosity. Oxidizing chemicals, as used in hair color, changes the chemical structure in the hair and decreases the chemical bonding in the hair. These natural and artificial effects make the selection of the proper preformulated product, such as a permanent waving solution, very difficult.

The variations of a permanent wave lotion to reduce human hair are controlled by the same principles of thermodynamics as most chemical reactions: the interaction of time, temperature and concentration of the active (reducing) agent. The "perfect" perm would "reduce" the number of disulfide bonds in the hair necessary to give a permanent change in shape, but not more than necessary. Excess reduction will cause weak, dry and/or breaking hair. Under reduction will cause "temporary" permanent wave results. The "perfect" perm must balance the, time, temperature and activity versus all the possible variables.

U.S. Pat. No. 3,527,236 is directed to a manually operated device for dispensing a hair treatment formulation in response to a selected number of hair condition factors. There is no means for automatically dispensing a plurality of cosmetically functional mixtures in response to specific input criteria controlled by a computing means.

U.S. Pat. No. 4,160,271 discloses a cosmetic selection device in which a skin preparation is selected based on a number of personal color characteristics. There is no means for dispensing cosmetically functional mixtures for formulating a custom mixed cosmetic product at the point of sale.

U.S. Pat. No. 4,476,913 is directed to an apparatus for automatically controlling the time and temperature for applying a hair treatment product based on a number of hair condition criteria. There is no disclosure of a device for automatically dispensing a plurality of cosmetically functional mixtures for providing a custom mixed hair treatment formulation to be applied at a fixed time and temperature at the point of sale.

SUMMARY OF THE INVENTION

The present invention is directed to an apparatus for automatically formulating and dispensing a custom mixed cosmetic product at the point of sale in response to input criteria based on the customer's specific needs. The apparatus includes a plurality of containers for storing a plurality of cosmetically functional mixtures that are adapted to interact when proper amounts are mixed to form a cosmetic product. An input means is provided for entering the specific input criteria representative of the customer's need into a computer control means. The computer outputs a series of instruction sets in response to the specific input criteria to a dispensing means. The dispensing means automatically and sequentially dispenses proper amounts of the plurality of cosmetically functional mixtures into a formulation receptacle in response to the instruction sets. The plurality of cosmetically functional mixtures combine in the receptacle to form a custom mixed formulation of a cosmetic product at the point of sale for immediate application. The device is adapted to formulate and dispense various cosmetic products such as permanent waving solutions, shampoos, dyes, skin lotions, etc. To provide the various cosmetic products, the mixture may be in the form of suspensions, emulsions, solutions, that may or may not contain chemically active reagents.

BRIEF DESCRIPTION OF THE DRAWINGS

FIGS. 6*a*–6*f* depicts a flow chart for the operation of the device of the present invention.

DETAILED DESCRIPTION OF THE INVENTION

Figure 1:
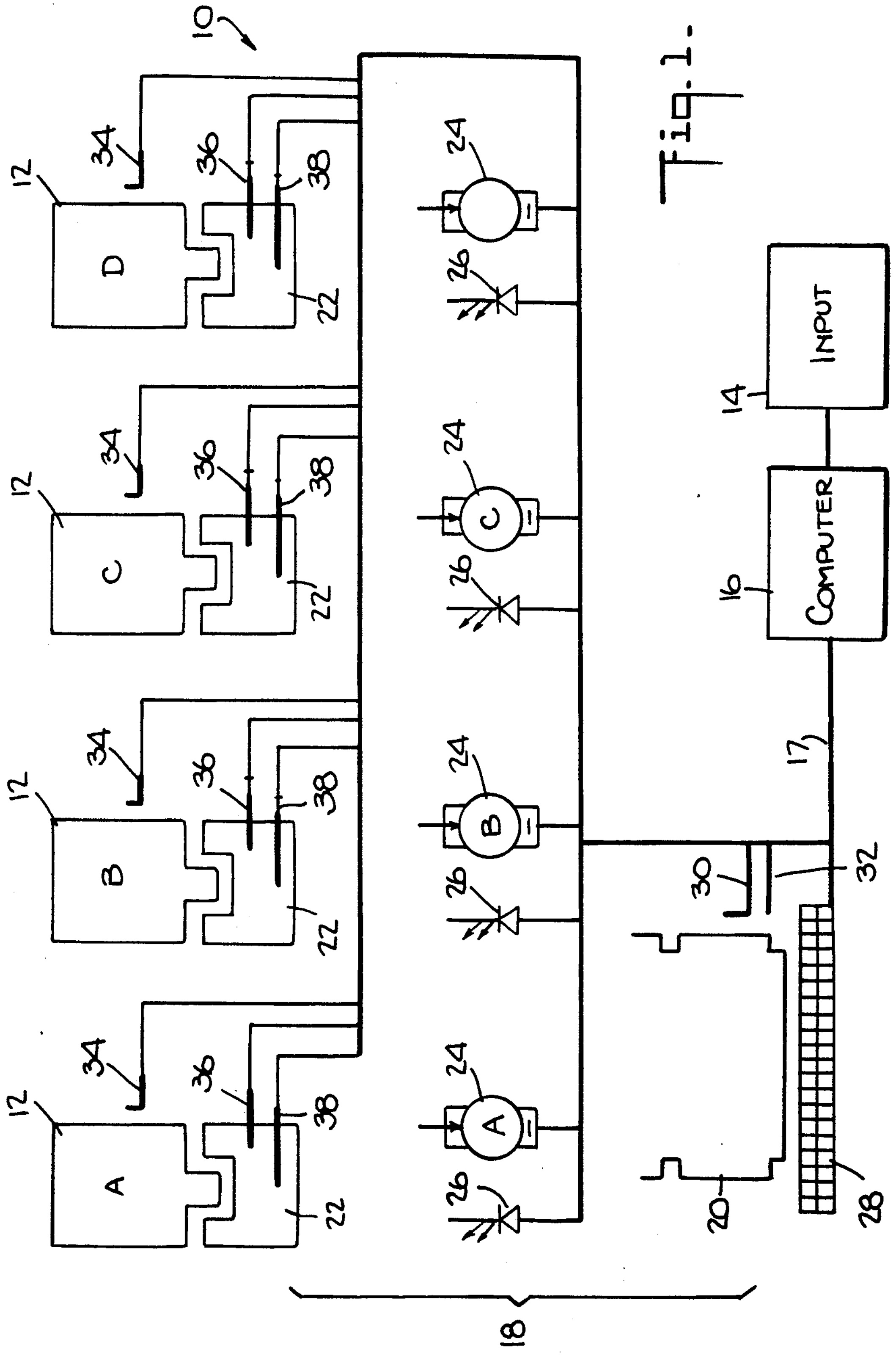
FIG. 1 is a block diagram of the formulating device of the present invention.

Referring now to the drawings, FIG. 1 is a block schematic diagram of the formulating device 10 of the present invention. Device 10 includes a plurality of containers 12 for storing a plurality of cosmetically functional mixtures that are adapted to combine with one another in forming a cosmetic product. Although FIG. 1 shows four containers, it should be understood that while the invention contemplates a plurality of containers, it is not limited to any specific number of containers. The device 10 further includes an input means 14 for entering specific input criteria representative of a customer's need at the point of sale. The input means 14 is connected to a computer means 16 that outputs a series of instruction sets in response to the specific input criteria. The instruction sets are outputted through a data bus 17 to a dispensing means 18 that automatically and sequentially dispenses a plurality of cosmetically functional mixtures into a formulation receptacle 20 in response to the instruction sets The plurality of cosmetically functional mixtures combine in the receptacle 20 to form a custom mixed formulation of a cosmetic product at the point of sale.

As shown in FIG. 1, the dispensing means 18 generally includes a reservoir 22 for each container 12. The reservoirs 22 include a connection means, not shown, for connecting each container 12 to the reservoir 22. Associated with each of the reservoirs 22 are valves 24 for individually controlling the flow of the mixtures from each of the containers into the reservoir 20. Indicator LEDs 26 are associated with each of the valves 24 for alerting the user that a particular mixture is being dispensed. A load cell 28 is provided for controlling the amount of liquid dispensed into the receptacle 20.

In general, the dispensing means 18 operates to automatically dispense pre-determined amounts of the plurality of cosmetically functional mixtures into the receptacle 20 where they mix to form the custom formulation. Each mixture contains a unique mixture of chemicals with each such unique mixture being located at a specific location referenced A, B, C and D. The computer determines the specific amounts of each mixture to be dispensed and begins dispensing by opening valve 24A while maintaining valves 24B, 24C and 24D closed. Load cell 28 senses the weight of the mixture A being dispensed in receptacle 20 and provides appropriate signals to the computer. The computer will automatically close valve 24A when the desired amount of that mixture is dispensed. The computer similarly opens valves 24B, 24C and 24D in sequence. At the end, the dispensed amounts of mixture combine in receptacle 20 to form the desired custom mixed formulation.

The dispensing means 18 is also provided with a series of sensors for checking the connection of the system compounds and the various mixture levels. A sensor 30 is associated with receptacle 20 for sensing whether the receptacle is properly connected and a sensor 32 is provided to determine whether the receptacle is empty and therefore ready for a new formulation to be dispensed. Similarly, the containers are provided with connection sensors 34 for ascertaining whether each container is properly connected to the system. In addition, solution level sensors 36 and 38 are associated with each reservoir 22 for determining that a minimum amount of mixture is present (sensor 36) and whether the reservoir is empty (sensor 38).

Figure 2:
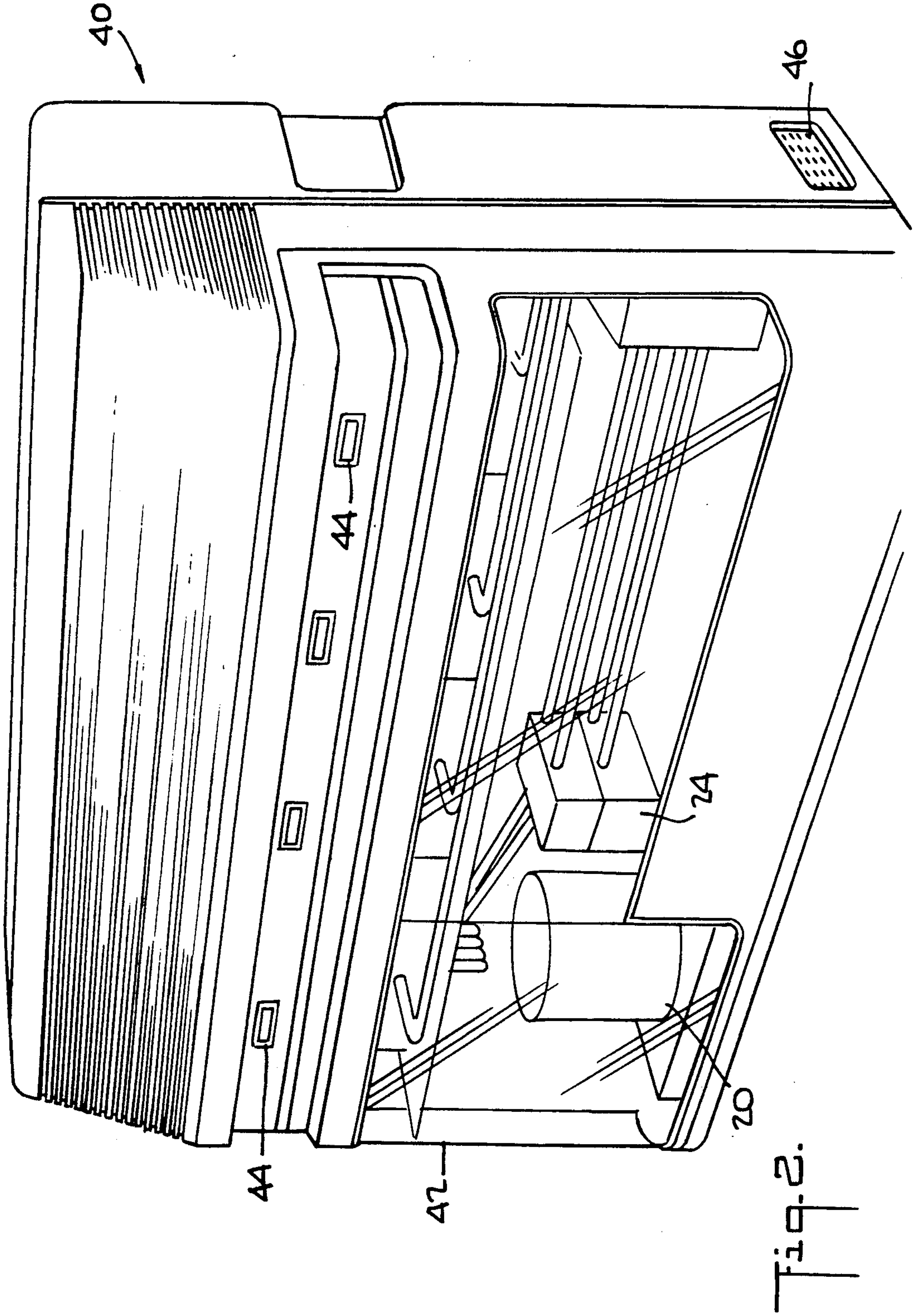
FIG. 2 is a perspective view of the dispensing apparatus of the formulating device of the present invention.

The dispensing means 18 and containers 12 are located in a housing 40 as shown in FIG. 2. The housing 40 may include a transparent panel 42 for exposing the formulation receptacle 20 so that the user may witness the dispensing of the cosmetically functional mixtures. Indicators 44 are illuminated by LEDs 26 to indicate which mixture is being dispensed. It should be understood that the specific arrangement of receptacle 20 and valves 24 shown in FIG. 2 is illustrative only and other arrangements are contemplated such as with receptacle 20 positioned in the center of the housing and the four valves 24 positioned directly above the receptacle 20. The positioning of these components is a matter of design choice and is not critical to the invention.

Figure 3:
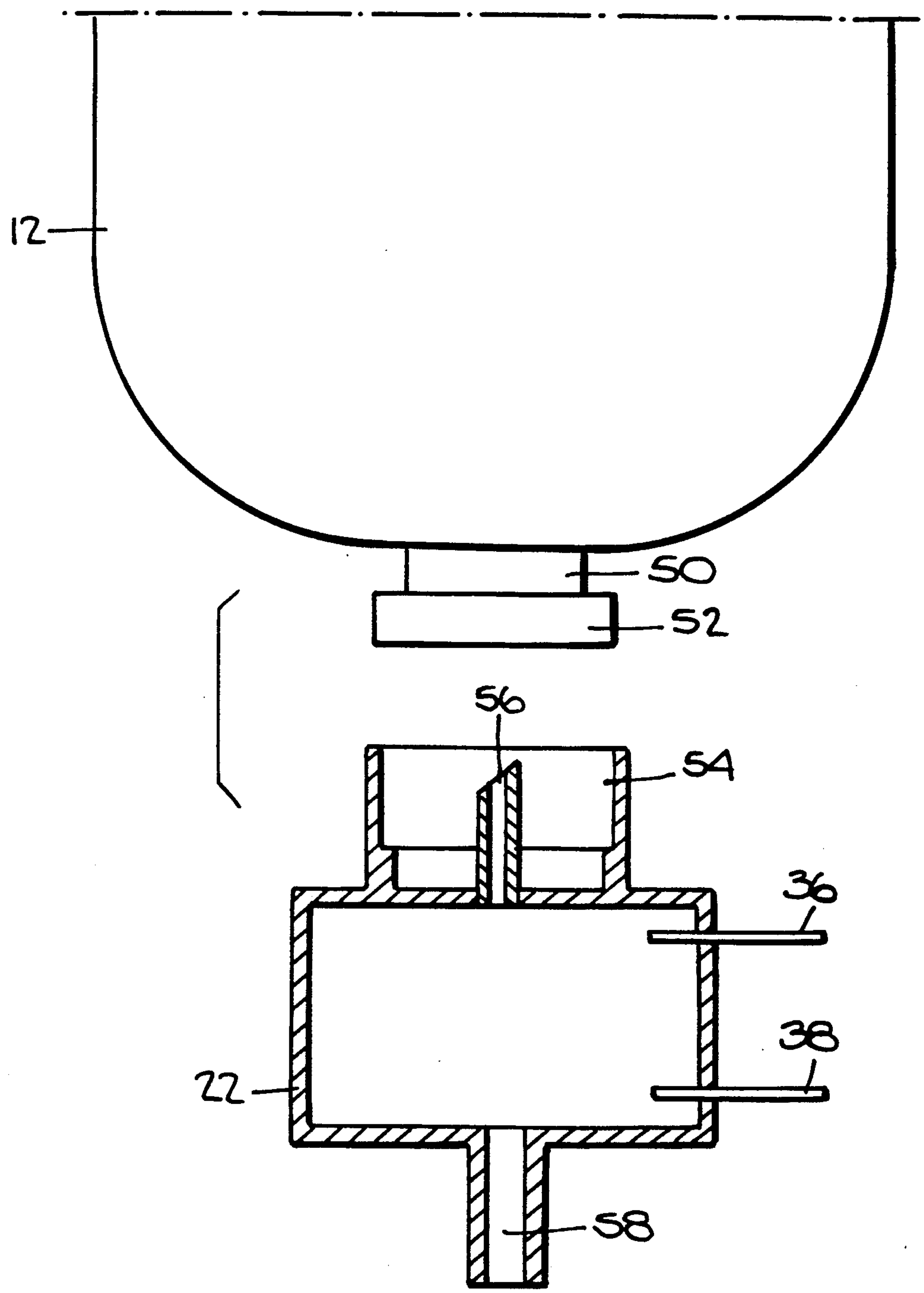
FIG. 3 is a schematic diagram of the interconnection of a cosmetic mixture solution container to the dispensing apparatus.

FIG. 3 shows a schematic of the connection between the containers 12 and the reservoirs 22. The containers 12 may be made of any one of several types of material such as rigid or collapsable. Each container includes a rigid neck 50 and a male connector cap 52. The connector cap has a puncturable seal, such as rubber and may include a metallic medical seal covering the rubber seal. The cap 52 is designed to fit snuggly within female connector 54 attached to the reservoir 22. Puncture needle 56 is located within the female connector 54 for puncturing the seal of the cap 52 upon insertion of the male connector 52 into the bottom of the female connector 54. This will permit the mixture contained in container 12 to flow into and fill the reservoir 22 and fluid tube 58 which couples the reservoir 22 to the valve 24.

As noted above, each container 12 has a unique combination of chemicals for forming custom mixed cosmetically functional mixtures. The computer 16, based on the specific input criteria for each customer, determines the specific amount of each of the mixtures to be dispensed, and outputs control signals to each specific valve 24. It is therefore critical that the mixture in each container location A, B, C and D be the proper solution. If the mixtures are not properly located in their specific positions, the proper formulation will not be dispensed. In order to ensure that the proper mixture is located in the proper container position, each container in the system may be provided with a unique locking means for connecting the container to the reservoir. One unique locking means is to provide the mating male and female members 52 and 54 for each location with a different shape. For example, the reservoir 22 in location A may have a round shaped female member 54 that will only accept containers having round male members 52. Likewise, reservoirs 22B, 22C and 22D will also have unique shaped female connectors such as hexagon, square and triangular and containers designated for these locations will have correspondingly shaped male connectors. As the mixtures contain chemically active agents, the unique interlocking system will also provide a measure of user safety.

Figure 4:
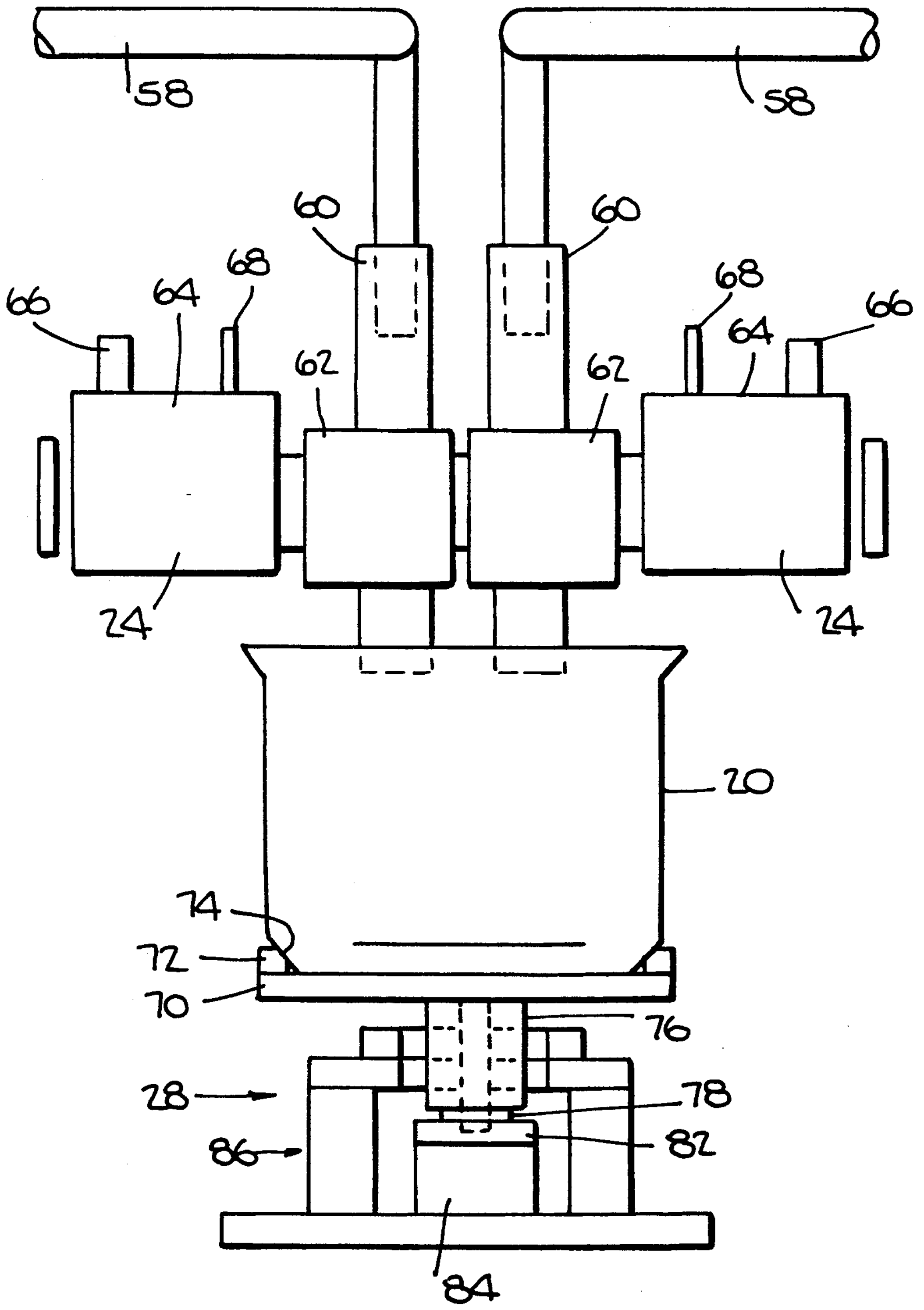
FIGS. 4 and 4*a* are schematic diagrams of the chemical solution control valves, formulation receptacle and load cell of the device of the present invention.

As shown in FIG. 4, the connecting tube 58 leads to the valves 24 for dispensing the solutions into receptacle 20. The arrangement as shown in FIG. 4 is for a centrally located receptacle 20 and is an elevation view in which only two valves 24 can be seen as other valves are located directly behind the two valves shown in the drawing. The supply tubes 58 are coupled to valve feeding tubes 60 which pass through the valve mechanical section 62. The valves 24 are electromechanical valves and include electrical control sections 64 having a connector 66 and a ground terminal 68. Electromechanical valves that may be used in the present invention are well known and a further description thereof is not required. In general, the valves are normally closed to prevent the flow of liquid through the feeding tube 60 and upon the application of a voltage to terminal 66, the valves will open to allow mixture to be dispensed.

Figure 4A:
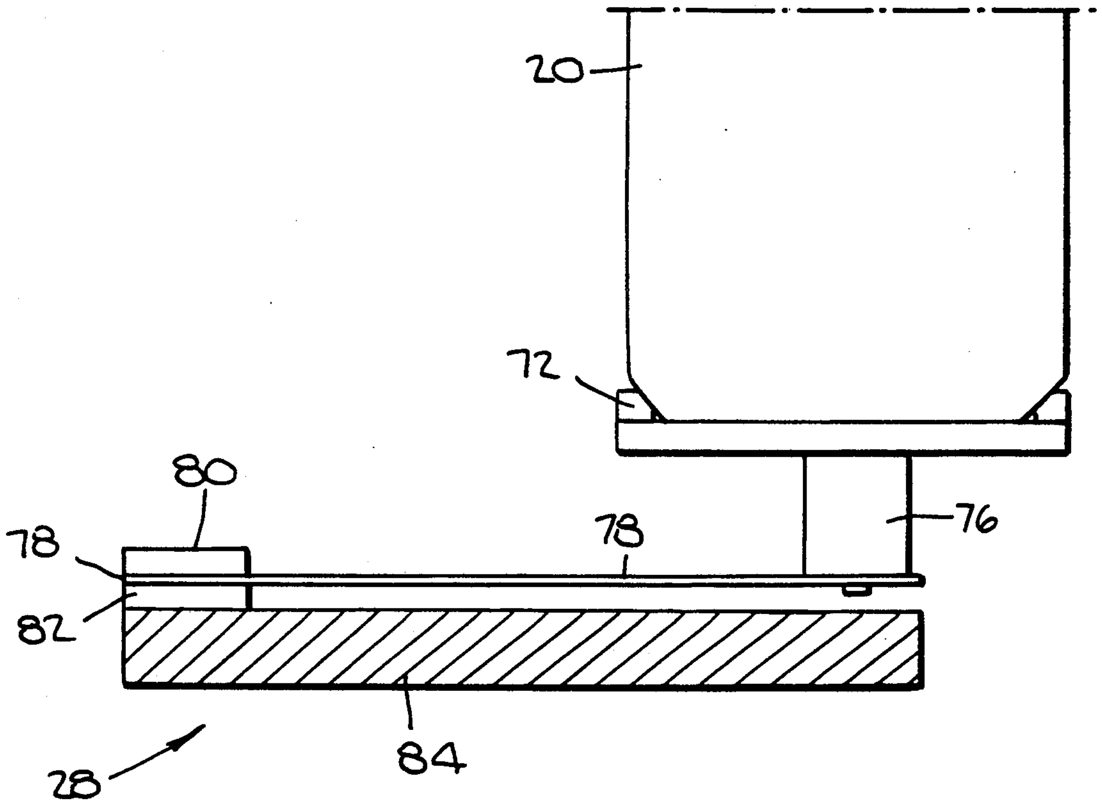

Also shown in FIG. 4 is a load cell 28 for determining the amount of mixture dispensed into the receptacle 20. The load cell 28 may be any well known device which senses the amount of mixture in the container by weight. The cell includes a weight plate 70 having a plate ring 72 for locating the receptacle 20. Preferably, receptacle 20 will have inclined surfaces 74 that mate with an inclined surface on ring 72 in order to securely position receptacle 20 on the plate 70. Secure positioning of the receptacle 20 is necessary to insure accurate weight sensing. A cylinder spreader weight cell 76 is located between the plate 70 and an enlongated torsional member 78. The torsional member 78 is better seen in FIG. 4*a* which is a side view of the load cell 28. A ceramic cell and cable output 80 is attached to the opposite end of the torsional member 78 and a twist connection member 82 connects the torsional member 78 to a reference base 84. The base 84 is supported in a holder 86. The load cell operates on movement of the torsional member 78 caused by the weight of solution dispensed into the receptacle, which causes the voltage produced by ceramic cell 80 to change. This voltage change is transmitted to the computer controlling the system which outputs a control signal to close the corresponding valve when the voltage indicative of the desired weight is achieved.

Figure 5:
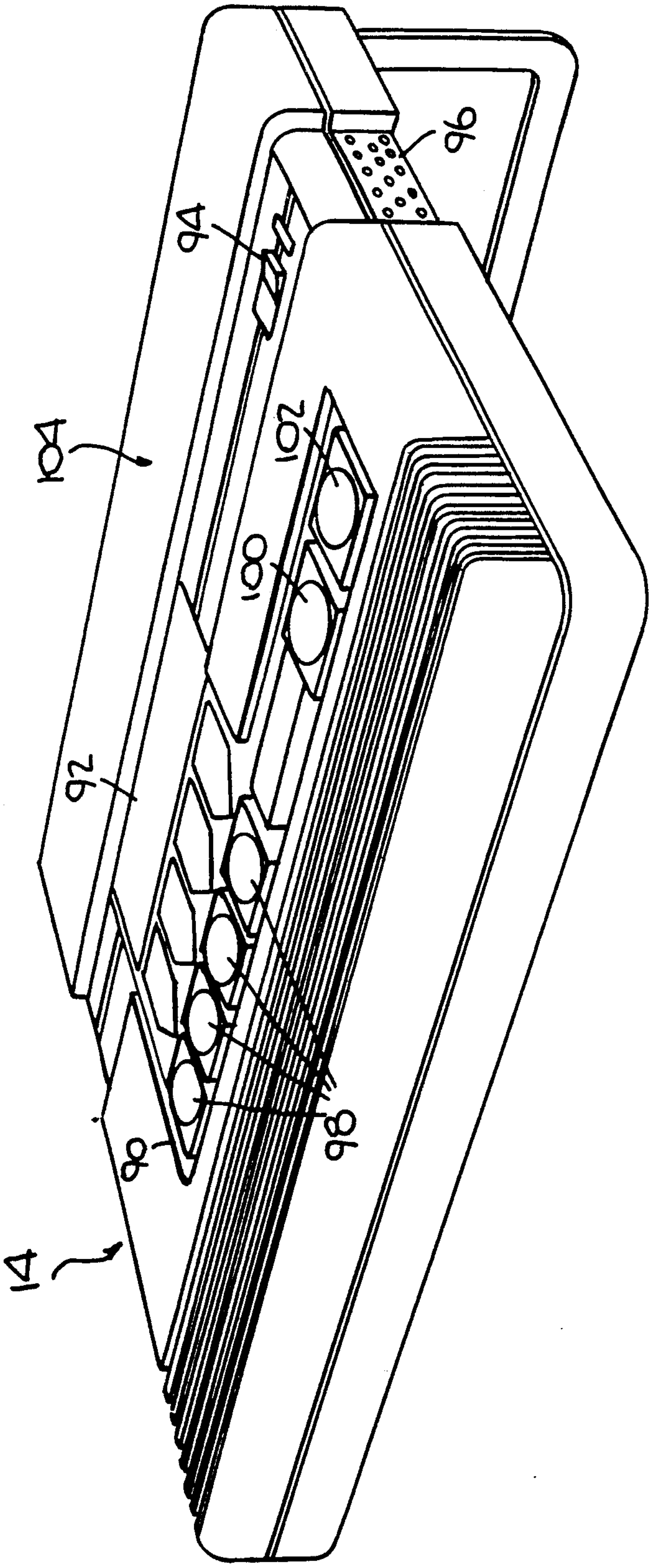
FIG. 5 is a perspective view of the input keyboard of the device of the present invention.

As shown in FIG. 5, the input means 14 for inputting the specific criteria includes a keyboard 90 and a display 92. The input unit 14 includes an on/off switch 94 and cable connector 96 for coupling via cable to the housing connector 46 as shown in FIG. 2. The keyboard includes four pushbuttons 98 corresponding to positions on the display 92. An enter button 100 and a reset button 102 are also included. The input means is enclosed in a housing 104, which also contains the computer and associated memory and data control circuitry. The specific input criteria are entered into the computer in response to specific questions directed to the customer that are necessary to determine the proper formulation of cosmetic product to be dispensed. The questions are displayed on display 92 in the form of various choices of conditions and the choice is selected by pressing the corresponding button 98 that is directly under the selected condition. Button 100 is then pressed in order to enter that selection into the computer. Button 102 may be depressed in order to change a selection prior to entry.

The system of the invention may be used to custom mix cosmetic formulations for any of several cosmetic products such as shampoos, hair conditioners, permanent waving products, etc. In determining the unique combination of ingredients to form each of the mixtures, it is desirable through a statistical analysis to prepare the mixtures such that each mixture will be consumed at substantially the same rate. Initially, a plurality of sets of criteria that define sets of customer needs for the particular cosmetic product are determined. Thereafter, the plurality of preset formulations is defined with each formulation being responsive to a set of individual customer needs. A plurality o preset formulations are then compared against statistical averages of the customer needs. These averages are readily obtained from past experience in dealing with the various customer needs for the various cosmetic products being formulated. Thereafter, the plurality of stock mixtures are prepared that may then be subsequently blended to form the preset formulations in view of the statistical distributions such that each of the plurality of stock mixtures is consumed at substantially the same rate. Thus, the device of the invention using such uniquely prepared mixtures will dispense the mixtures at the point of sale in response to the various specific sets of customer needs and will thereby result in each of the mixtures being consumed at substantially the same rate.

In the device of the present invention, the computer is programmed with specific algorithms to dispense the desired cosmetic formulation. For illustrative purposes only, the following is a detailed description of a particular program for dispensing a permanent wave formulation.

In using the device of the present invention for formulating a custom mixed permanent wave formulation, the hair being treated is first characterized by the beauty parlor operator as falling within one of four (4) general classifications or basic types of hair depending on its degree of damage. These four basic types are Bleached, Tinted, Normal and Resistant. "Bleached" represents hair that is most damaged while "Resistant" represents a hair type that is not damaged. These four damage condition choices will appear on the display 92 and the user will select the proper condition that applies to the customer.

After being placed in one of such four primary classes of hair, the hair to be treated is then further subclassified by the beauty parlor operator into one of three (3) secondary classifications of hair based on porosity. These secondary classifications indicate that the hair is either highly porous, medium, or low in porosity. Porosity is an important factor since it indicates the ability of the hair to absorb fluid, i.e., the permanent wave solution.

After being placed in one of the three secondary subclasses of hair, the hair is further subclassified by diameter or thickness of the hair into another group of classification criteria, to indicate whether the hair is of fine, medium or coarse diameter. As with the damage criteria, each of the porosity and diameter criteria are displayed and selections made that are entered into the computer memory. The porosity and the diameter/-volume relationship are interrelated to define a hair treatment absorption ability.

The subclassification of each client's hair in this manner enables the beauty parlor operator to obtain a much finer description of the condition of the client's hair at any one given time. It thus enables the beauty parlor operator to provide more reproducible results from one permanent wave treatment to the next, since it takes into consideration the more basic condition of the client's hair.

Hair falling within one of the four basic classifications and one of the secondary classes will also be sub-sub-classifiable in each of the tertiary subclasses and thus falls, automatically, into one of thirty six (36) sub-subclasses of hair. A specific hair waving solution for each subclass of hair has been developed for the thirty six (36) subclasses of hair, and is provided by Table I below. A more detailed description of the 36 formulations is provided in copending U.S. patent application, U.S. Ser. No. 07/483,367, to Gustave Klein et al., said application being incorporated herein by reference.

TABLE I

Permanent Wave Mixture Varying As To Concentration & pH (% By Weight)

| Medium | 1 | 2 | 3 | 4 | 5 | 6 | 7 | 8 | 9 | 10 | 11 | 12 |
|---|---|---|---|---|---|---|---|---|---|---|---|---|
| Ammonium thioglycolate (50%) | 22.0 | 21.0 | 20.0 | 19.0 | 18.0 | 17.0 | 16.0 | 15.0 | 13.5 | 12.0 | 11.0 | 10.4 |
| Diammonium dithioglycolate | 3.0 | 4.1 | 5.1 | 6.2 | 7.2 | 8.3 | 9.3 | 10.4 | 10.9 | 11.5 | 12.5 | 12.9 |
| Ammonium hydroxide (25%) | 5.0 | 4.6 | 4.2 | 3.8 | 3.4 | 3.0 | 2.6 | 2.2 | 1.8 | 1.4 | 1.0 | 0.7 |
| Polyquaternium - 4 | — | — | — | — | — | — | — | — | 1.0 | 1.1 | 1.2 | 1.4 |
| Polyquaternium - 10 | 1.0 | 1.1 | 1.2 | 1.3 | 1.4 | 1.5 | 1.6 | 1.7 | 1.8 | 1.0 | 2.0 | 2.1 |
| $Na_5$ (EDTA)$_5$ | 0.2 | 0.2 | 0.2 | 0.2 | 0.2 | 0.2 | 0.2 | 0.2 | 0.2 | 0.2 | 0.2 | 0.2 |
| Propylene glycol | 6.0 | 6.0 | 6.0 | 6.0 | 6.0 | 6.0 | 6.0 | 6.0 | 6.0 | 6.0 | 6.0 | 6.0 |
| Laureth 23 | 2.0 | 2.0 | 2.0 | 2.0 | 2.0 | 2.0 | 2.0 | 2.0 | 2.0 | 2.0 | 2.0 | 2.0 |

TABLE I-continued

| Permanent Wave Mixture Varying As To Concentration & pH (% By Weight) | | | | | | | | | | | | |
|---|---|---|---|---|---|---|---|---|---|---|---|---|
| Perfume | 0.5 | 0.5 | 0.5 | 0.5 | 0.5 | 0.5 | 0.5 | 0.5 | 0.5 | 0.5 | 0.5 | 0.5 |
| Water | 60.3 | 60.5 | 60.8 | 61.0 | 61.3 | 61.5 | 61.8 | 62.0 | 62.3 | 63.4 | 63.6 | 63.8 |
| pH | 9.9 | 9.8 | 9.7 | 9.5 | 9.3 | 9.1 | 8.9 | 8.7 | 8.5 | 4 | 8.1 | 7.9 |
| Fine | 13 | 14 | 15 | 16 | 17 | 18 | 19 | 20 | 21 | 22 | 23 | 24 |
| Ammonium thioglycolate (50%) | 22.0 | 21.0 | 20.0 | 19.0 | 18.0 | 17.0 | 16.0 | 15.0 | 13.5 | 12.0 | 11.0 | 10.4 |
| Diammonium dithioglycolate | 3.0 | 4.1 | 5.1 | 6.2 | 7.2 | 8.3 | 9.3 | 10.4 | 10.9 | 11.5 | 12.5 | 12.9 |
| Ammonium hydroxide (25%) | 5.0 | 4.6 | 4.2 | 3.8 | 3.4 | 3.0 | 2.6 | 2.2 | 1.8 | 1.4 | 1.0 | 0.7 |
| Polyquaternium - 4 | — | — | — | — | — | — | — | — | 1.0 | 1.1 | 1.2 | 1.4 |
| Polyquaternium - 10 | 1.0 | 1.1 | 1.2 | 1.3 | 1.4 | 1.5 | 1.6 | 1.7 | 1.8 | 1.0 | 2.0 | 2.1 |
| $Na_5$ $(EDTA)_5$ | 0.2 | 0.2 | 0.2 | 0.2 | 0.2 | 0.2 | 0.2 | 0.2 | 0.2 | 0.2 | 0.2 | 0.2 |
| Propylene glycol | 6.0 | 6.0 | 6.0 | 6.0 | 6.0 | 6.0 | 6.0 | 6.0 | 6.0 | 6.0 | 6.0 | 6.0 |
| Laureth 23 | 2.0 | 2.0 | 2.0 | 2.0 | 2.0 | 2.0 | 2.0 | 2.0 | 2.0 | 2.0 | 2.0 | 2.0 |
| Perfume | 0.5 | 0.5 | 0.5 | 0.5 | 0.5 | 0.5 | 0.5 | 0.5 | 0.5 | 0.5 | 0.5 | 0.5 |
| Water | 55.3 | 55.5 | 55.8 | 56.0 | 56.3 | 56.5 | 56.8 | 57.0 | 57.3 | 58.4 | 58.6 | 58.8 |
| pH | 9.9 | 9.8 | 9.7 | 9.5 | 9.3 | 9.1 | 8.9 | 8.7 | 8.5 | 4 | 8.1 | 7.9 |
| Coarse | 25 | 26 | 27 | 28 | 29 | 30 | 31 | 32 | 33 | 34 | 35 | 36 |
| Ammonium thioglycolate (50%) | 22.0 | 21.0 | 20.0 | 19.0 | 18.0 | 17.0 | 16.0 | 15.0 | 13.5 | 12.0 | 11.0 | 10.4 |
| Diammonium dithioglycolate | 3.0 | 4.1 | 5.1 | 6.2 | 7.2 | 8.3 | 9.3 | 10.4 | 10.9 | 11.5 | 12.5 | 12.9 |
| Ammonium hydroxide (25%) | 5.0 | 4.6 | 4.2 | 3.8 | 3.4 | 3.0 | 2.6 | 2.2 | 1.8 | 1.4 | 1.0 | 0.7 |
| Polyquaternium - 4 | — | — | — | — | — | — | — | — | 1.0 | 1.1 | 1.2 | 1.4 |
| Polyquaternium - 10 | 1.0 | 1.1 | 1.2 | 1.3 | 1.4 | 1.5 | 1.6 | 1.7 | 1.8 | 1.0 | 2.0 | 2.1 |
| $Na_5$ $(EDTA)_5$ | 0.2 | 0.2 | 0.2 | 0.2 | 0.2 | 0.2 | 0.2 | 0.2 | 0.2 | 0.2 | 0.2 | 0.2 |
| Propylene glycol | 6.0 | 6.0 | 6.0 | 6.0 | 6.0 | 6.0 | 6.0 | 6.0 | 6.0 | 6.0 | 6.0 | 6.0 |
| Laureth 23 | 2.0 | 2.0 | 2.0 | 2.0 | 2.0 | 2.0 | 2.0 | 2.0 | 2.0 | 2.0 | 2.0 | 2.0 |
| Perfume | 0.5 | 0.5 | 0.5 | 0.5 | 0.5 | 0.5 | 0.5 | 0.5 | 0.5 | 0.5 | 0.5 | 0.5 |
| Water | 65.3 | 65.5 | 65.8 | 66.0 | 66.3 | 66.5 | 66.8 | 67.0 | 67.3 | 68.4 | 68.6 | 68.8 |
| pH | 9.9 | 9.8 | 9.7 | 9.5 | 9.3 | 9.1 | 8.9 | 8.7 | 8.5 | 4 | 8.1 | 7.9 |

After the hair is subclassified into one of thirty-six (36) subclasses corresponding to the thirty-six (36) specific formulas of Table I for each subclass of hair, it is possible with this invention to further classify the hair into twenty-seven (27) additional subclasses based on diameter (fine, medium, coarse), length (short, medium, and long) and population or density (low, medium, and high). This subclassification will control the amount or quantity of formula to be dispensed based on the amount of hair to be treated. These two additional criteria of length and population are also entered into the computer as noted above.

It is desirable to apply a code to each of the classes and subclasses of hair being treated. The resulting code can be of three digits. The first digit thereof could be one of the letters "R", "N", "T" and "B" which would stand for, respectively, Resistant, Normal, Tinted and Bleached. "Resistant" being the least damaged hair and Bleached the most damaged. The second digit of the code could be one of "L", "M" or "H" to stand for the degree of porosity (low, medium and high porosity). Porosity can be determined by the feel of the hair: smooth being high, ruffled being medium and rough being low. The third digit of the code could be one of the letters "F", "M" and "C", which would stand for the diameter of the hair (fine, medium and coarse).

This three digit code can then be used as a means to readily "pin-point" a hair sample into one of thirty six (36) specific permanent wave solutions of Table I. Such a coding system which can be used to classify the hair is shown in Table II.

In this permanent wave embodiment, the device comprises a series of four containers, with each containing one of four primary solutions. These primary solutions contain graduated amounts of the reducing agent to be used for the permanent wave treatment. Various amounts of each of these primary solutions are then blended together to form a secondary solution of the custom mixed formulation. The composition of the secondary solution will vary depending on the specific sub-subclass of hair to be treated. Since there are thirty six sub-subclasses of hair, according to the present invention, there will be provided, as noted above, a selection of thirty-six (36) secondary solutions or specific formulas for use in the present invention. Each one of such thirty-six (36) secondary solutions is thus tailored for use with only one of such thirty-six (36) sub-subclasses of hair.

TABLE II

| | Amount Of Primary Solutions, In Grams, From Containers 1 To 4 Of Table II Used To Make A Desired Final Solution | | | |
|---|---|---|---|---|
| Sub-subclass of Hair | Container N = 1 | Container N = 2 | Container N = 3 | Container N = 4 |
| 1. RLF | 34 | 33 | 21 | 18 |
| 2. RLM | 34 | 32 | 22 | 18 |
| 3. RLC | 33 | 33 | 22 | 18 |
| 4. RMF | 32 | 32 | 21 | 21 |
| 5. RMM | 32 | 30 | 24 | 20 |
| 6. RMC | 31 | 29 | 24 | 22 |
| 7. RHF | 31 | 28 | 22 | 25 |
| 8. RHM | 30 | 27 | 24 | 25 |
| 9. RHC | 29 | 27 | 24 | 26 |
| 10. NLF | 28 | 26 | 24 | 28 |
| 11. NLM | 27 | 26 | 26 | 27 |
| 12. NLC | 26 | 26 | 27 | 27 |
| 13. NMF | 25 | 25 | 27 | 29 |
| 14. NMM | 24 | 25 | 28 | 29 |
| 15. NMC | 23 | 25 | 28 | 30 |
| 16. NHF | 22 | 24 | 28 | 32 |
| 17. NHM | 22 | 23 | 29 | 32 |
| 18. NHC | 21 | 23 | 29 | 33 |
| 19. TLF | 20 | 21 | 30 | 35 |
| 20. TLM | 19 | 20 | 32 | 35 |
| 21. TLC | 18 | 19 | 32 | 37 |
| 22. TMF | 18 | 18 | 32 | 38 |
| 23. TMM | 17 | 18 | 32 | 39 |
| 24. TMC | 16 | 17 | 32 | 41 |
| 25. THF | 15 | 16 | 33 | 42 |
| 26. THM | 14 | 15 | 34 | 43 |
| 27. THC | 13 | 15 | 35 | 43 |
| 28. BLF | 12 | 14 | 37 | 43 |
| 29. BLM | 12 | 13 | 37 | 44 |
| 30. BLC | 11 | 13 | 37 | 45 |
| 31. BMF | 10 | 13 | 38 | 45 |
| 32. BMM | 10 | 12 | 38 | 46 |

TABLE II-continued

| | Amount Of Primary Solutions, In Grams, From Containers 1 To 4 Of Table II Used To Make A Desired Final Solution | | | |
|---|---|---|---|---|
| Sub-subclass of Hair | Container N = 1 | Container N = 2 | Container N = 3 | Container N = 4 |
| 33. BMC | 10 | 11 | 38 | 47 |
| 34. BHF | 9 | 11 | 39 | 47 |
| 35. BHM | 9 | 10 | 40 | 47 |
| 36. BHC | 9 | 9 | 41 | 47 |

TABLE III

| Primary Solution | % of Component in Container # | | | |
|---|---|---|---|---|
| Formulation Component | 1 | 2 | 3 | 4 |
| ammonium thioglycolate | 36.0 | 24.0 | 12.0 | 4.0 |
| diammonium dithioglycolate | — | — | — | 28.0 |
| ammonium hydroxide | 15.6 | — | — | — |
| Polyquaternium-4 | — | — | 2.0 | — |
| Polyquaternium-10 | — | — | 2.5 | — |
| $Na_5(EDTA)_5$ | 0.2 | 0.2 | 0.2 | 0.2 |
| propylene glycol | 6.0 | 6.0 | 6.0 | 6.0 |
| water | 7.0 | 7.0 | 7.0 | 7.0 |
| Laureth-23 | 2.0 | 2.0 | 2.0 | 2.0 |
| perfume | 0.5 | 0.5 | 0.5 | 0.5 |
| water | 32.1 | 60.1 | 66.8 | 52.0 |
| D&C yellow No. 10 0.5% solution | 0.6 | — | — | — |
| FD&C blue No. 1 1.0% solution | — | — | — | 0.3 |
| D&C red No. 33 1.0% solution | — | — | 1.0 | — |
| styrene-acrylate copolymer | — | 0.2 | — | — |
| TOTAL | 100.00 | 100.00 | 100.00 | 100.00 |

The primary solutions disclosed in Table III are used to form thirty-six (36) secondary solutions as they may be individually needed in order to treat each sub-subclass of hair. When the hair is sub-subclassified into one of the thirty-six (36) sub-subclasses of hair according to Table II, it is then treated with a final solution therefor which is particularly designed to meet the cold wave permanent treatment needs of such sub-subclass of hair. In Table I, thirty-six (36) final solutions needed for this purpose are prepared from the four primary solutions of Table III and in accordance with the recipes therefor which are shown in Table II.

In the reducing step of the permanent waving of this invention, the time and temperature are constant while the concentration and activity rate of the reducing agent are varied in accordance with the type and condition of the hair. The hair stylist first examines the hair to determine its type according to the degree of damage (Bleach, Tinted, Normal and Resistant), then its porosity (fine, medium, and coarse) Once this examination and selection has been made the device automatically dispenses and the stylist thereafter simply applies the appropriate reducing solution for that customer. The reducing solution will have a specified pH, specified thioglycolate concentration and a specified activity rate, which may be buffered, for that particular subclass of hair. Since time and temperature are constant in all cases, these variables are eliminated.

The Table II recipes indicate the number of grams of each of the four primary solutions which are to be blended together to form a single dose of a final solution for treating each sub-subclass of hair. Thus, for example, as seen in Table II, to treat "RLF" hair, a final solution is made from 34 grams of the solution in Container No. 1, 33 grams of the solution in Container No. 2, 21 grams of the solution in Container No. 3 and 18 grams of the solution in Container No. 4. The blending together of the delineated gram-weight portions of the primary solutions to get the desired final solution is automatically achieved by the computer controlled formulating and dispensing device of the present invention. To enable this result, the computer memory will have stored therein a look-up table identical to Table II. In the "RLF" example, the computer outputs instructions to the dispensing means to automatically and sequentially dispense the designated grams for each container. Each dose of the final solution will consist of 106 grams or about 100 ml of solution. One or more doses of such final solutions may be needed to treat a client's hair depending on the amount of hair to be treated.

The amount or quantity of dose to be applied to the client's hair is then controlled by further classifying the hair according to diameter (fine, medium or coarse), length (short, medium, or long) and finally the density or population of the hair (low, medium, or high). To determine population, dense is high, normal is medium and sparse is low. These twenty-seven (27) subcategories are based on quantity, and thus make it possible to have 927 subclasses of hair that may be treated with one of thirty-six (36) different formulas modified as to quantity to provide 927 final individualized formulas. The twenty-seven subcategories for quantity of solution are also stored in memory as a look-up table as shown in Table IV. The table has a quantity factor by which the gram amounts in Table II are multiplied to determine the specific amounts of each solution to be dispensed from each container. The computer selects the proper quantity subcategory based on the diameter, length and population data entered by the user, and automatically dispenses the individualized quantity of the individualized formulation.

TABLE IV

| Quantity Factor for Determining Amount of Table I Permanent Wave Applied to Hair Based on Diameter, Length and Population of Hair | |
|---|---|
| Subclass of Hair | Factor |
| 1. FSL | 0.70 |
| 2. FSM | 0.80 |
| 3. FSH | 0.90 |
| 4. FML | 0.85 |
| 5. FMM | 0.95 |
| 6. FMH | 1.05 |
| 7. FLL | 1.00 |
| 8. FLM | 1.10 |
| 9. FLH | 1.20 |
| 10. MSL | 0.75 |
| 11. MSM | 0.85 |
| 12. MSH | 0.95 |
| 13. MML | 0.90 |
| 14. MMM | 1.00 |
| 15. MMH | 1.10 |
| 16. MLL | 1.05 |
| 17. MLM | 1.15 |
| 18. MLH | 1.25 |
| 19. CSL | 0.80 |
| 20. CSM | 0.90 |
| 21. CSH | 1.00 |
| 22. CML | 0.95 |
| 23. CMM | 1.05 |
| 24. CMH | 1.15 |
| 25. CLL | 1.10 |
| 26. CLM | 1.20 |
| 27. CLH | 1.30 |

Prior to treating the hair with the final solution designated therefor, the hair is washed or otherwise treated to remove any contaminants therefrom that might otherwise interfere with the cold permanent waving process. Such contaminants would include dust, dirt, skin scales, sebum, and residues from hair sprays and conditioners.

The final solution is then applied to the hair at a temperature of about 30°±1° C. using conventional permanent wave applicator materials and hair curling techniques. The final solution is allowed to be in contact with the hair for a period of about 15 to 20 minutes. Subsequently, the thus treated hair is rinsed to remove residues of the final solution and then treated with a neutralizing oxidizing agent to finalize the setting of the hair, using known oxidizing agents such as 2 to 4% hydrogen peroxide. The computer may be programmed to display one of two choices of neutralizer determined by the particular formulation.

FIGS. *6a–6f* show a flow chart for the operation of the device of the present invention in connection with a program for dispensing a custom mixed permanent wave formulation at the point of sale. The program will automatically begin to run upon turning on the switch 94. The first decision block 110 inquires whether a general test of the system is to be conducted. A question asking the user whether the tests are to be performed will be displayed on a screen with a yes or a no displayed above buttons 98. If the button under yes is pressed and the enter button 100 is pressed then the various test functions will be displayed on a screen. The various functions may be manually checked or the computer may be programmed to automatically detect certain conditions based on the various sensors included in the system. The several test functions are shown in FIGS. *6a* and *6b*, which begin with decision block 112 to determine whether the dispensing means is electrically connected to the keyboard 14. In addition, decision block 114 questions whether each of the containers A, B, C and D are properly connected. Decision block 116 questions whether each tank should be refilled. If yes, decision block 118, questions whether the tank should be refilled now and, if no, the display will indicate that the solution remaining will permit a certain number of perms to be formulated. Decision block 120 questions whether the containers are empty. Decision block 122 questions whether the formulation receptacle is connected and decision block 124 questions whether the receptacle is empty. If not empty, decision block 126 questions whether the receptacle has been emptied and if not, the program will stop until the receptacle is empty in order to prevent formulation being dispensed into a receptacle already having a previous formulation solution therein.

Referring back to FIG. *6a*, after the test program has been completed or if no test was selected, the program then inquires as shown in FIG. *6c* whether a memory input is to be entered as shown by decision block 128. If the memory input is not to be used, decision block 130 questions whether detailed instructions are necessary to be displayed on the screen. After the instructions have been displayed or if they are not required by the user, the various input criteria are entered in sequence as shown in FIGS. *6c*, *6d* and *6e*. The first classification is the damage level to determine whether the hair is resistant, bleached, tinted or normal. Decision block 132 questions whether the damage criteria has been entered and if yes, goes on to the next criteria which is porosity. Decision block 134 questions whether the porosity has been entered and if yes, the next inquiry is hair thickness. Decision block 136 questions whether the thickness has been entered and if yes, the next criteria is hair length. Decision block 138 questions whether hair length has been entered and if yes, the last criteria is hair population. Decision block 140 questions whether the population has been entered and if yes, that completes all the specific input criteria for the permanent hair waving formulation.

Based on the entered information, the computer will determine which of the formulations is to be selected for this particular customer. The computer then determines from the look-up table identical to Table II the amounts of the 4 solutions to be dispensed. In addition, the computer determines which of the 27 quantity categories is to be selected from Table IV and the computer will then determine the quantity of the formulation that the particular customer requires. As indicated in Table II the specific weight in grams of the solution to be dispensed for each of the formulations is provided. Table IV is a quantity factor by which each of the specific weights in the particular formulation selected is multipled. Thus, if the quantity factor for subcategory 1, (fine diameter, short length and low density) is selected the program will provide instructions to dispense 70% of the weight amounts for that formulation as shown in Table II from each container.

Block 142 of FIG. *6e* indicates that a particular client formula number has been assigned to that particular formulation and quantity. The formula number is in the form of a four digit code that will be displayed on the display 92. An automatic printout may be provided as indicated at 144 or alternatively, the user may merely write down the number displayed on the screen for further use. The client code number is the number that may be entered in response to decision block 128 shown in FIG. *6c*. Thus, if the client already has used the system and knows his or her code number the number may be entered directly into the computer, by-passing all of the inquiries regarding the hair condition.

Decision block 146 questions whether the code number has been entered and if yes, moves directly to decision block 148 (FIG. *6e*) to determine whether the process should continue. If the no button is selected, the program stops and the screen will ask whether it should continue or terminate. If the decision is to continue, the program has the ability to select the full quantity level or a part quantity level, typically one half. If the customer has hair in different sections that has different conditions, the program may be run to determine a first formulation that is appropriate for one section of the hair and a second formulation that is appropriate for a second section of the hair, for example roots (normal) and ends (damaged). In this situation, it would be appropriate to select a one half level of each of the formulations as they will be applied to only a portion of the hair. In addition, in the event that the operator does not properly enter the quantity criteria, and as the formulation is being applied, the determination is made that more is necessary, a part level may be selected in order to avoid having another full quantity dispensed when only a small amount is needed. Decision block 150 questions whether the full or part level has been selected and if yes the next step is to dispense the formulation. Decision block 152 questions whether the formulation is to be filled at that moment or not. If yes, the formulation is filled by dispensing each of the preprogrammed amounts of the four solutions into the formulation receptacle. The display will indicate that the formulations are mixing and filling and once completely filled the display will indicate that the perm lotion is ready.

Decision block 154 questions whether the receptacle has been removed from the load cell. If yes, the display will indicate one of two choices of neutralizer to be used. The selected neutralizer is a prepackaged neutralizer and is determined based on the hair condition criteria entered into the computer. This is provided by another simple look up table in which each formulation of Table II is classified for either of the two neutralizers. In addition, a similar look-up table corresponding to Table IV will permit the computer to display whether the customer needs a full or half portion of neutralizer.

Figure 6A:
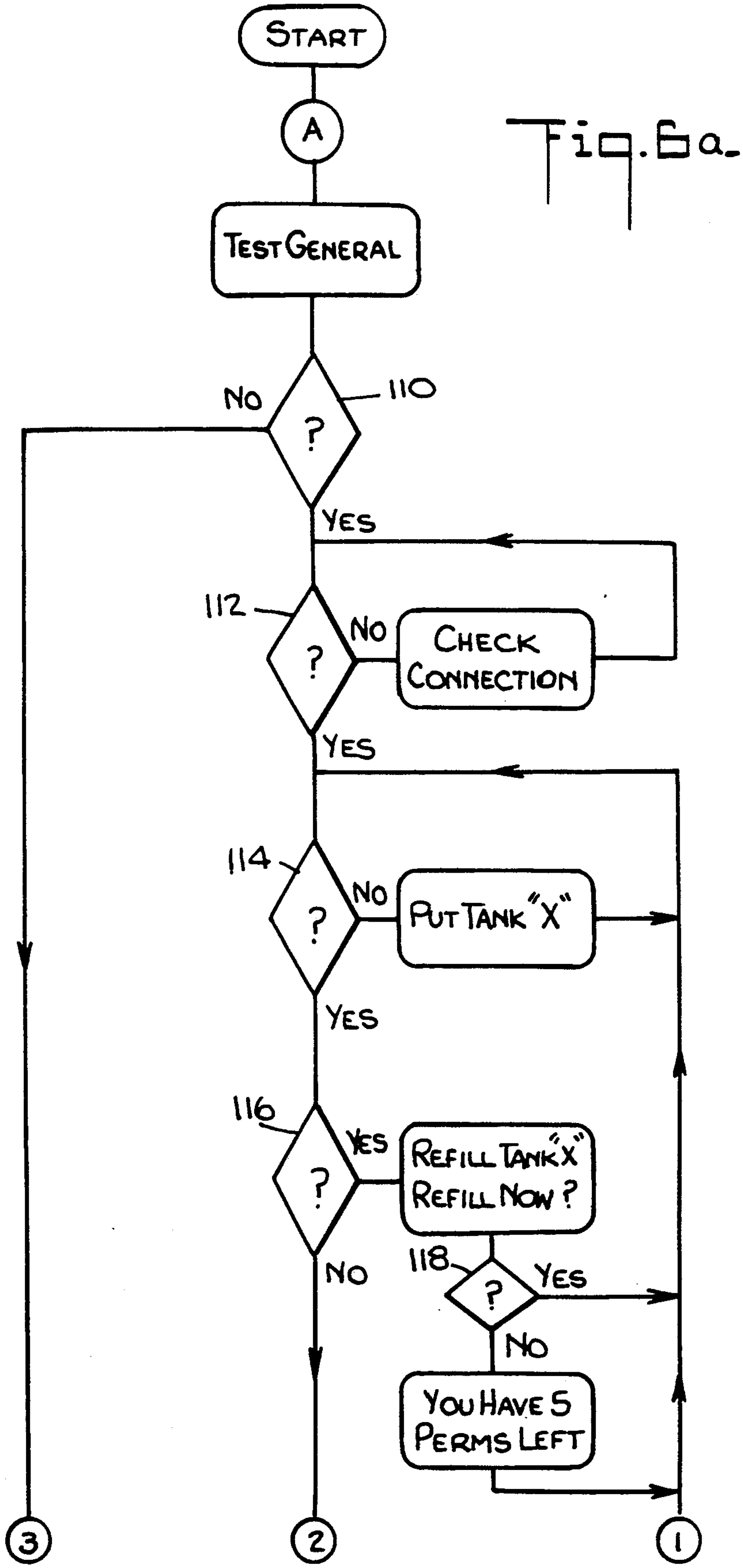
Figure 6B:
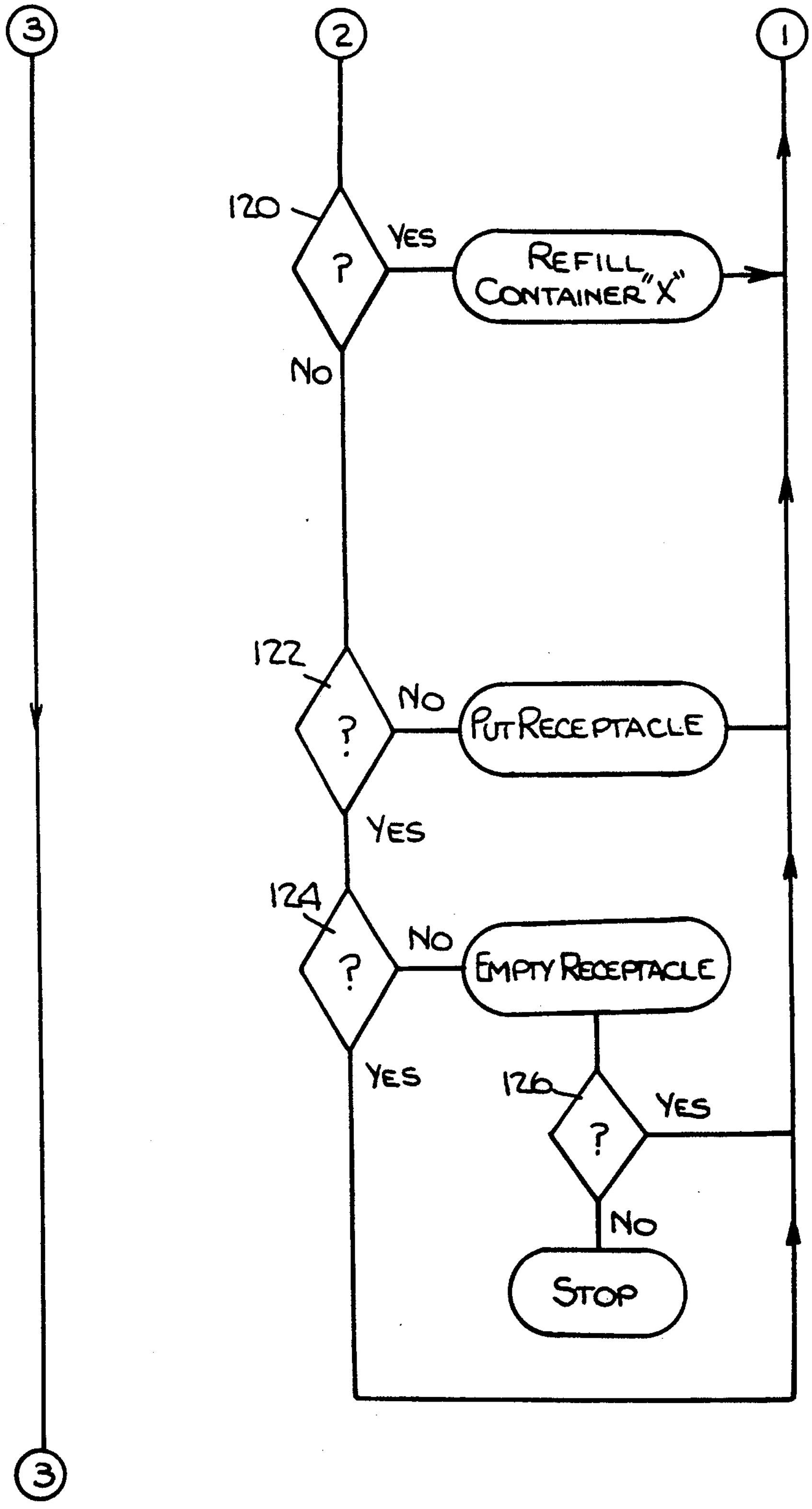
Figure 6C:
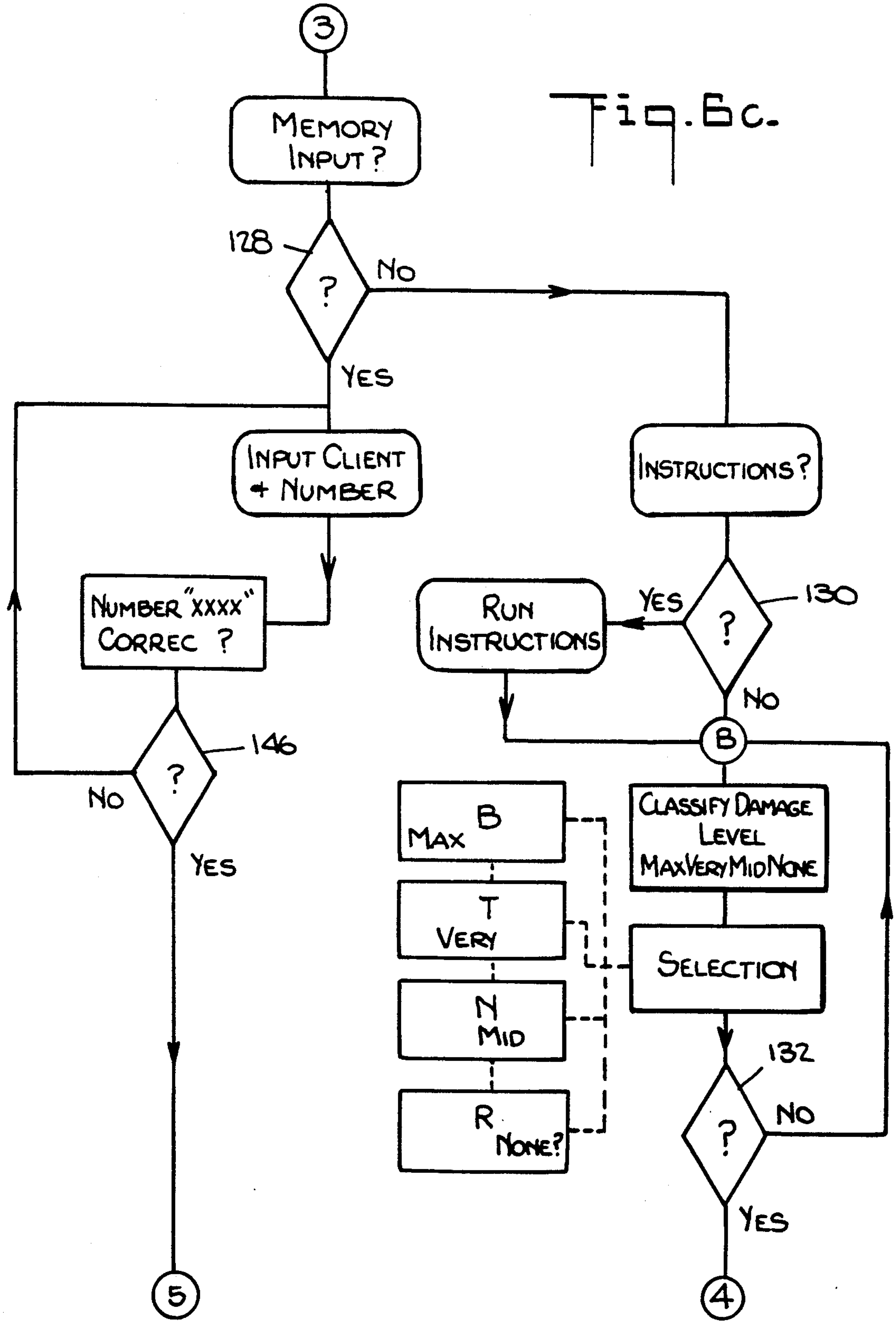
Figure 8D:
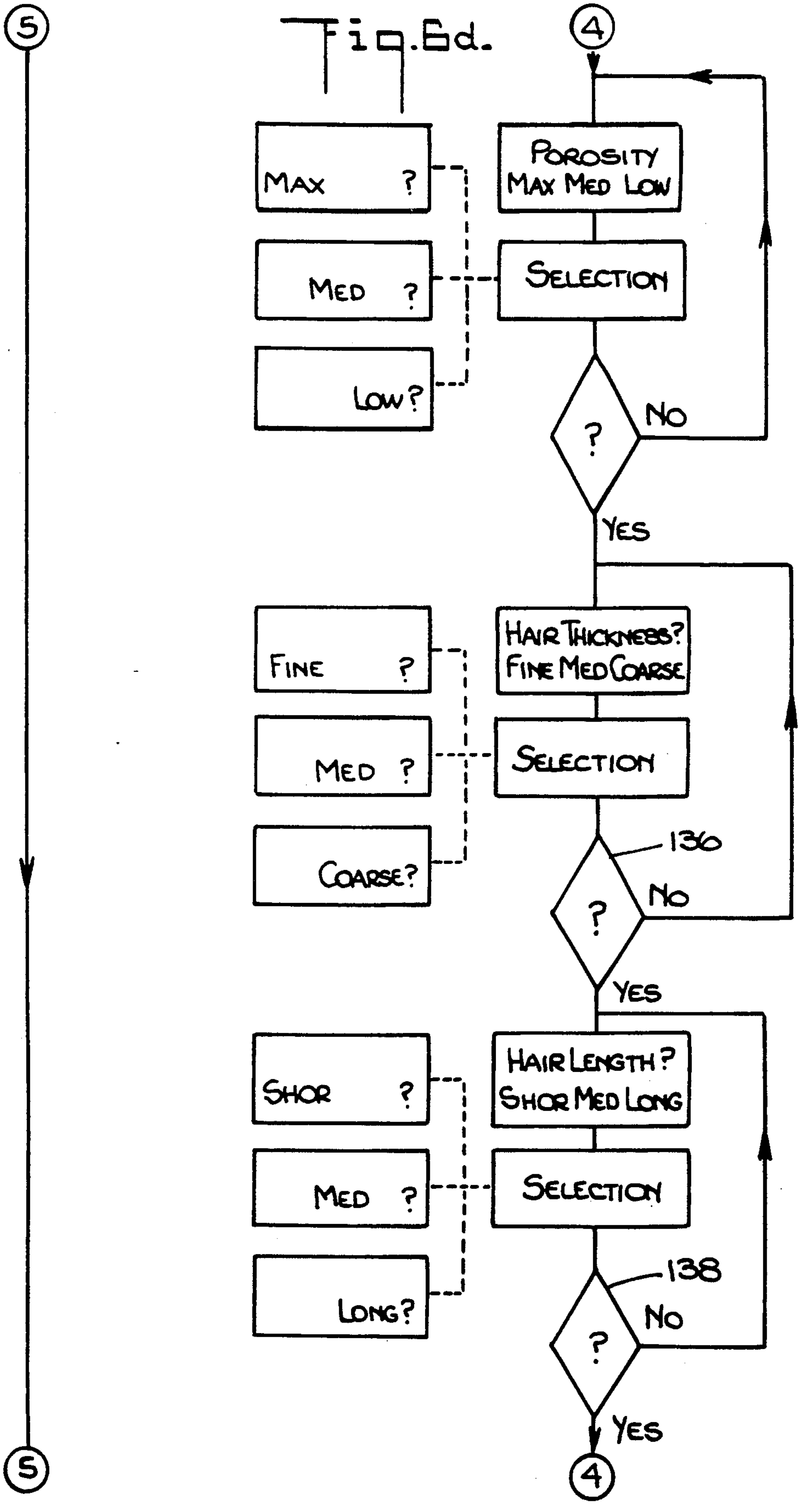
Figure 6E:
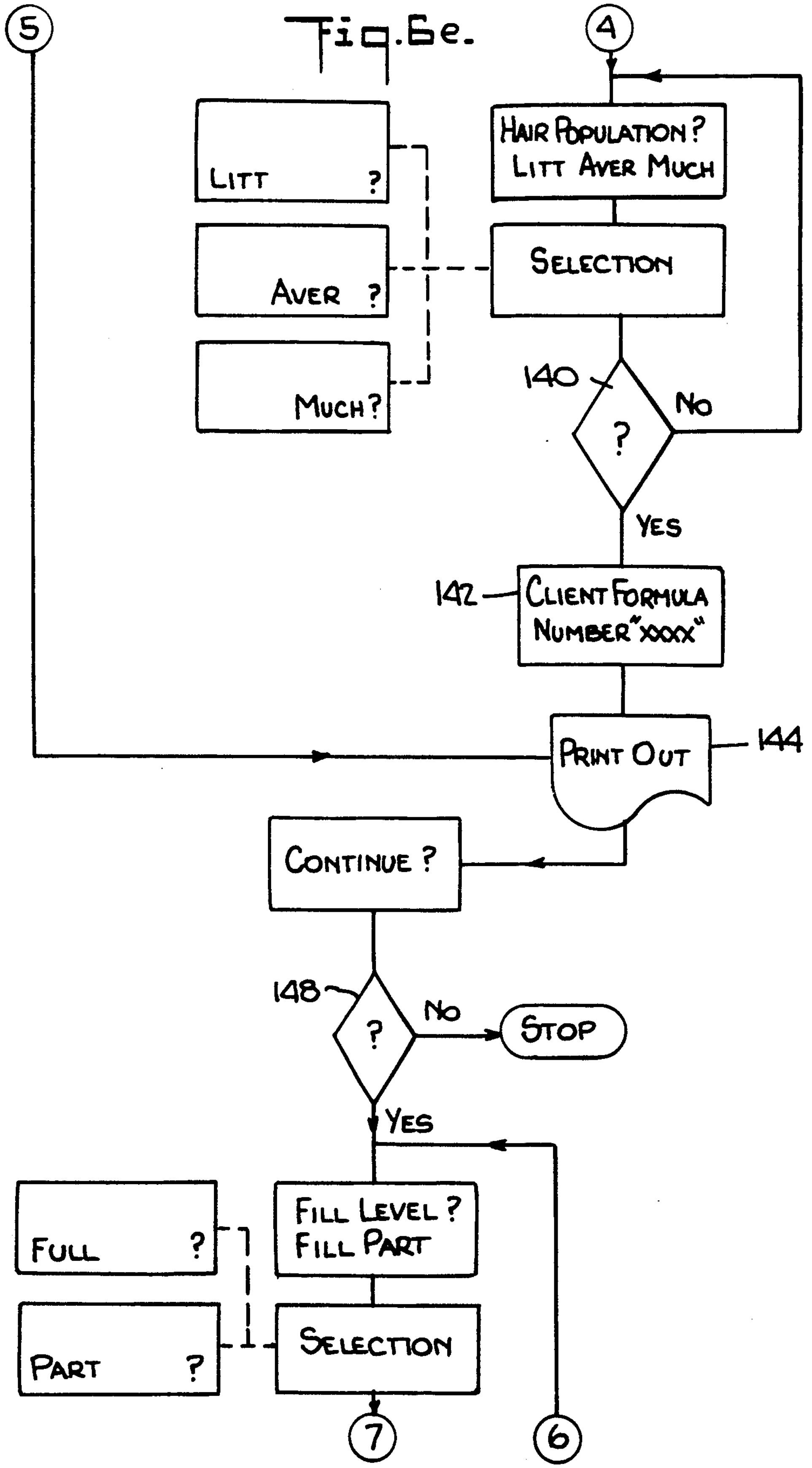
Figure 6F:
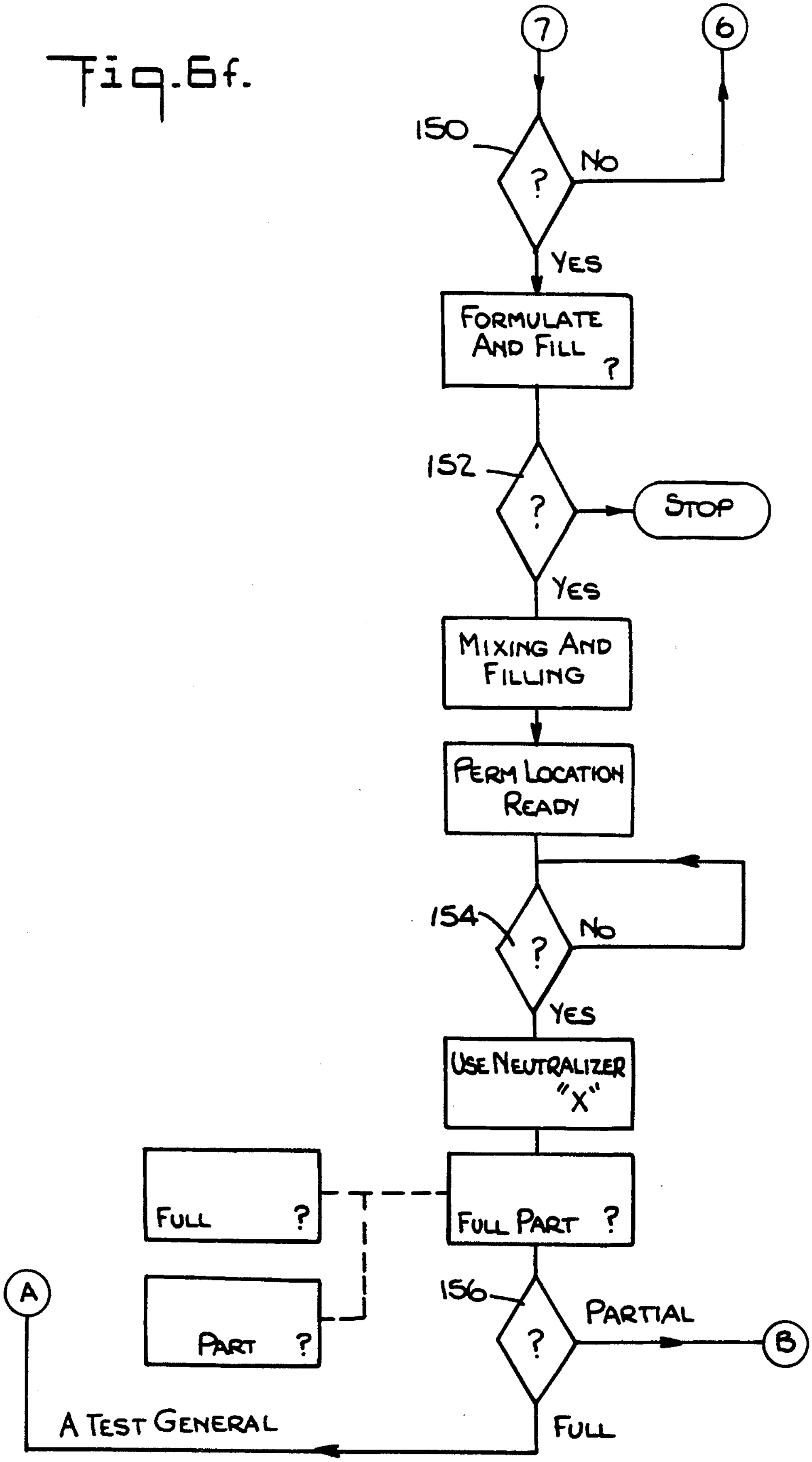

At this point, the program as shown by the decision box 156 will inquire whether a partial second run-through of the program is desired or a full second run-through is desired. The partial program will return to the beginning of the classification of the hair damage which would be appropriate if the first formulation was for one section of the customer's hair and another formulation is to be determined for another section of the customer's hair. A full run through would be appropriate if the client already knows it has two formulations and knows the code numbers for the formulations. The user would return to the beginning of the program as shown in FIG. 6*a* select no for test, select yes for memory input and plug in the formulation code number for the second formulation.

Figure 7:
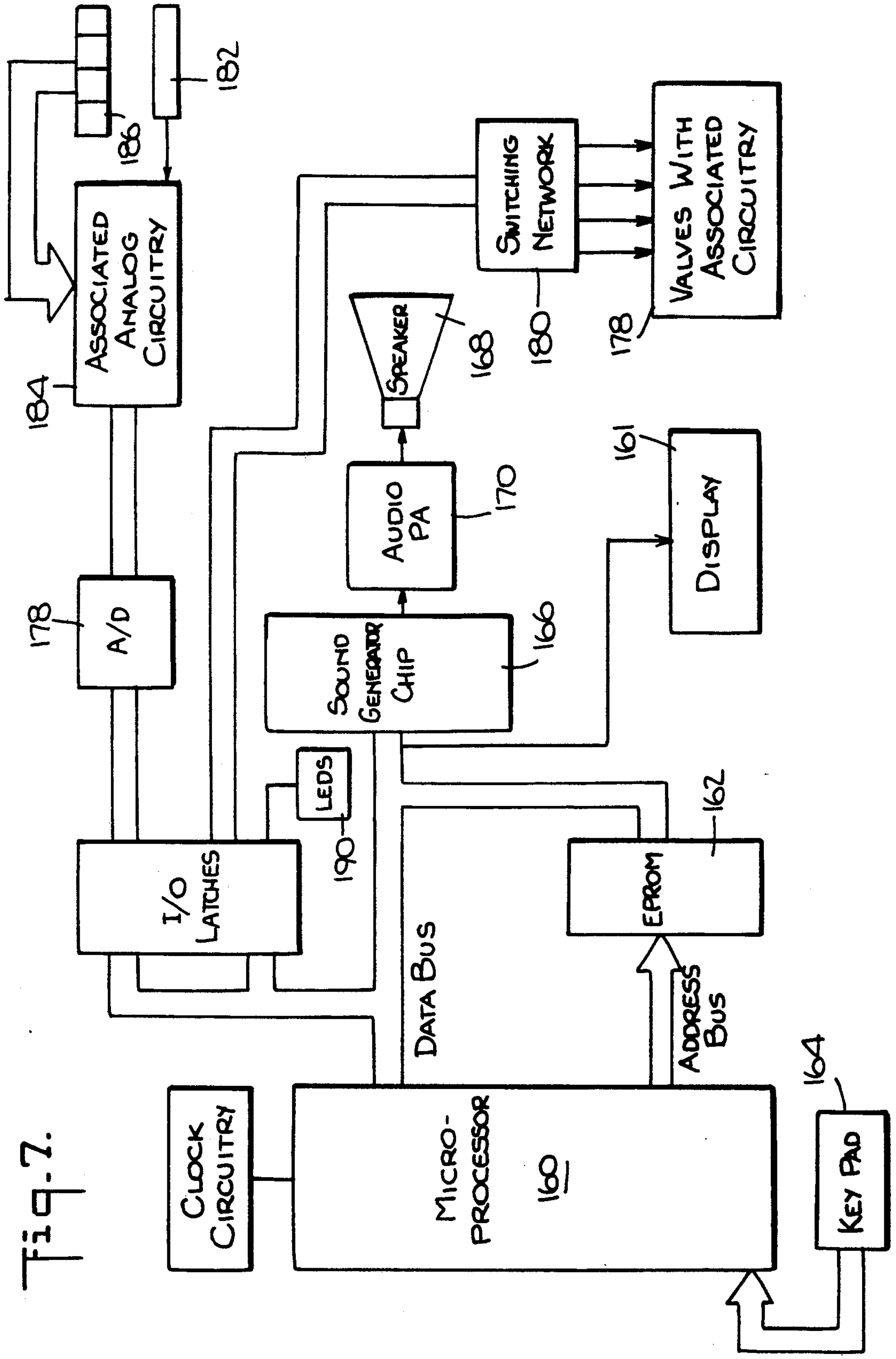
FIG. 7 is a block diagram of the electrical system of the device of the present invention.

FIG. 7 shows a general block diagram of the hard-wired circuitry of the present invention. The microprocessor 160 which may be a 8031 microprocessor controls the functions of the system and is provided with memory 162 which may be implemented in an EPROM. The input keypad 164 inputs the data directly to the microprocessor 160 as the operator responds to prompts from display 161. The program then runs and a particular client formulation is determined. During the running of the program, an optional sound generator 166 may be actuated to emit audio signals from speaker 168 through audio circuit 170. The optional sound circuit portion may also be utilized during the dispensing cycles. Once the program is completed and the formulation and amount of formulation has been selected, the microprocessor 160 will output control signals through digital to analog converter 174 to actuate the valves 178 through a valve control circuit 180. Load cell 182, through its associated analogue circuit 184, provides analog signals to the microprocessor 160 through the analog/digital converter 174. The microprocessor then determines when to actuate each of the valves 178 to dispense the specific weight of each of the four solutions into the receptacle. Solution sensors 186 provide signals through circuit 184 to the microprocessor 160 and warning lights 190 will be appropriately displayed.

While the invention has been particularly shown and described with respect to the preferred embodiments thereof, it should be understood by those skilled in the art that the foregoing and other changes in form and detail may be made therein without departing from the spirit and scope of the invention which should be limited only by the scope of the appended claims.

What is claimed is:

1. An apparatus for formulating a custom mixed cosmetic product at the point of sale in response to specific input criteria, said apparatus comprising:

(a) a plurality of cosmetically functional mixtures, each solution of said plurality of solutions being in a separate container, said solutions being adapted to interact to form a cosmetic product;

(b) input means for entering specific input criteria representative of a customer's need at the point of sale comprising combinations of hair damage criteria, hair porosity criteria, and hair diameter criteria;

(c) computing means which comprises a first and a second look up table stored in memory, said first look up table having a plurality of sets of amounts of said plurality of cosmetically functional mixtures, each set of amounts being defined by a combination of a first group of specific input criteria, and a means for selecting one of said sets of amounts in response to specific input criteria of said first group entered at the point of sale; and wherein said second look up table has a plurality of quantity factors, each quantity factor being defined by a combination of a second group of specific input criteria, and a means for selecting one of said quantity factors in response to specific input criteria of said second group entered at the point of sale, and a means for multiplying the amounts in said selected set of amounts by said selected quantity factors to determine custom amounts of said cosmetically functional mixtures to be dispensed to prepare said custom mixed formulation at the point of sale, and wherein said first look up table comprises 36 sets defined by 4 hair damage criteria, 3 hair porosity criteria, and 3 hair diameter criteria; and (d) dispensing means for automatically dispensing said plurality of cosmetically functional mixtures sequentially from their respective containers into a formulation receptacle in response to said instruction sets, said plurality of cosmetically functional mixtures interacting in said receptacle to thereby form a custom mixed formulation of cosmetic product at the point of sale.

2. The apparatus of claim 1 wherein said second group of specific input criteria includes combinations of hair density criteria and hair length criteria.

3. The apparatus of claim 2 wherein said second look up table includes 9 quantity factors, said 9 factors being defined by 3 hair density criteria and 3 hair length criteria.

4. The apparatus of claim 3 wherein said first and second look up tables includes amounts and quantity factors of said plurality of cosmetically functional mixtures, which when dispensed into said receptacle will interact to form a permanent hair waving product to be applied for a fixed predetermined time and temperature.

5. An apparatus for formulating a custom mixed cosmetic product at the point of sale in response to specific input criteria, said apparatus comprising:

(a) four buffered chemically active solutions, each solution in accordance with the following table, being in a separate container, said solutions being capable of interacting to form a cosmetic product;

TABLE III

| Primary Solution | % of Component in Container # | | | |
|---|---|---|---|---|
| Formulation Component | 1 | 2 | 3 | 4 |
| ammonium thioglycolate | 36.0 | 24.0 | 12.0 | 4.0 |
| diammonium dithioglycolate | — | — | — | 28.0 |
| ammonium hydroxide | 15.6 | — | — | — |

TABLE III-continued

| Primary Solution Formulation Component | % of Component in Container # 1 | 2 | 3 | 4 |
|---|---|---|---|---|
| Polyquaternium-4 | — | — | 2.0 | — |
| Polyquaternium-10 | — | — | 2.5 | — |
| $Na_5(EDTA)_5$ | 0.2 | 0.2 | 0.2 | 0.2 |
| propylene glycol | 6.0 | 6.0 | 6.0 | 6.0 |
| water | 7.0 | 7.0 | 7.0 | 7.0 |
| Laureth-23 | 2.0 | 2.0 | 2.0 | 2.0 |
| perfume | 0.5 | 0.5 | 0.5 | 0.5 |
| water | 32.1 | 60.1 | 66.8 | 52.0 |
| D&C yellow No. 10 0.5% solution | 0.6 | — | — | — |
| FD&C blue No. 1 1.0% solution | — | — | — | 0.3 |
| D&C red No. 33 1.0% solution | — | — | 1.0 | — |

TABLE III-continued

| Primary Solution Formulation Component | % of Component in Container # 1 | 2 | 3 | 4 |
|---|---|---|---|---|
| styrene-acrylate copolymer | — | 0.2 | — | — |
| TOTAL | 100.00 | 100.00 | 100.00 | 100.00 |

(b) input means for entering specific input criteria representative of a customer's need at the point of sale;

(c) computing means for outputting a series of instruction sets in response to said specific input criteria; and (d) dispensing means for automatically dispensing each of said chemically active solutions sequentially from their respective containers into a formulation receptacle to thereby form a custom mixed formulation of a cosmetic product at the point of sale.

* * * * *